(12) United States Patent
De Souza Sana et al.

(10) Patent No.: US 7,930,646 B2
(45) Date of Patent: Apr. 19, 2011

(54) DYNAMICALLY UPDATED VIRTUAL LIST VIEW

(75) Inventors: Giselli Panontini De Souza Sana, Redmond, WA (US); Rajatish Mukherjee, Issaquah, WA (US); Scott C. Mikula, Woodinville, WA (US); Jim R. Van Eaton, Woodinville, WA (US); Russell L. Simpson, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 769 days.

(21) Appl. No.: 11/875,124

(22) Filed: Oct. 19, 2007

(65) Prior Publication Data

US 2009/0106687 A1 Apr. 23, 2009

(51) Int. Cl.
*G06F 3/048* (2006.01)
(52) U.S. Cl. ........................................................ 715/784
(58) Field of Classification Search .................. 715/784, 715/785, 786, 787
See application file for complete search history.

(56) References Cited

U.S. PATENT DOCUMENTS

| | | | |
|---|---|---|---|
| 5,959,626 A | 9/1999 | Garrison et al. | |
| 6,011,550 A | 1/2000 | Capps et al. | |
| 6,204,846 B1* | 3/2001 | Little et al. | 715/784 |
| 6,518,984 B1* | 2/2003 | Maeckel et al. | 715/786 |
| 6,734,883 B1* | 5/2004 | Wynn et al. | 715/830 |
| 7,523,412 B2* | 4/2009 | Jones et al. | 715/787 |
| 7,667,719 B2* | 2/2010 | Goodwin et al. | 345/684 |
| 2002/0109709 A1 | 8/2002 | Sagar | |
| 2004/0205496 A1 | 10/2004 | Dutta et al. | |
| 2005/0081164 A1 | 4/2005 | Hama et al. | 715/830 |
| 2005/0210403 A1* | 9/2005 | Satanek | 715/786 |
| 2005/0257166 A1 | 11/2005 | Tu | |
| 2006/0075358 A1 | 4/2006 | Ahokas | 715/784 |
| 2006/0242595 A1 | 10/2006 | Kizumi | 715/786 |
| 2007/0019244 A1* | 1/2007 | Rekiere | 358/3.28 |
| 2007/0100800 A1 | 5/2007 | Rose et al. | |
| 2007/0100915 A1 | 5/2007 | Rose et al. | |
| 2007/0136268 A1 | 6/2007 | Qureshi et al. | |
| 2008/0079972 A1 | 4/2008 | Goodwin et al. | 358/1.12 |
| 2009/0100373 A1* | 4/2009 | Pixley et al. | 715/786 |

FOREIGN PATENT DOCUMENTS

WO WO 2009/052033 A2 4/2009

OTHER PUBLICATIONS

PCT Search Report dated Apr. 21, 2009 cited in International Application No. PCT/US2008/079669.
European Supplementary Search Report and Search Opinion in EP 08 84 0667, mailed Dec. 15, 2010, 5 pages.
Navigation-Driven Evaluation of Virtual Mediated Views http://users.sdsc.edu/~ludaesch/Paper/edbt00-proc.pdf, (year: 2000).
Lean, Mean, and Virtually Data Bound http://msdn2.microsoft.com/en-us/library/bb263972.aspx, Jan. 4, 1999.
Virtual List View Demo http://www.mvps.org/vbvision/Sample_Projects.htm, (year: 2000).

* cited by examiner

*Primary Examiner* — Thanh T Vu
(74) *Attorney, Agent, or Firm* — Merchant & Gould P.C.

(57) ABSTRACT

A virtual list view in a web application is dynamically updated such that a user can seamlessly access and manage the presented data despite the inherent latency involved with the web. Data associated with the virtual list view is downloaded in chunks and the view updated as the user scrolls. By coupling the user's scrolling and particular chunks of data to be downloaded system resources are utilized in an efficient manner. Additional user interface controls for the user interface are employed for rapid and efficient access to portions of data minimizing delay and system resource occupation.

17 Claims, 8 Drawing Sheets

DYNAMICALLY UPDATED VIRTUAL LIST VIEW

BACKGROUND

Web browsing applications commonly present data to users in a list view. For example, pages of data that can be viewed by scrolling up or down using various controls such as a keyboard, a mouse, and the like. The viewable data may include text, graphics, combination of the two, etc. and may be formatted in actual list form (tables, bulleted items, and so on) or in free form. In either case, the web browsing application may present an arbitrarily large list of items to a user.

In a practical environment, the web application may attempt to download the whole data upon selection of a link to the data by the user before presenting it in its user interface. This approach may be infeasible by causing unacceptable delays in presentation of data to the user if the data is large, available bandwidth is small, or other system resources cause limitation in the downloading of the data from a web server. Another alternative approach is downloading the data in groups and updating the user interface as data is downloaded. However, this approach may also result in "clunkiness" in the system, where the presented webpage may show up in pieces, delays may annoy the user, and the system resources may be unnecessarily occupied with downloading the whole data when the user may be interested only in a particular piece of it.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to dynamically updating a virtual list view in a web application such that a user can seamlessly access and manage the presented data despite the inherent latency involved with the web. Data associated with the virtual list view may be downloaded in chunks and the view updated as the user scrolls. By coupling the user's scrolling and particular chunks of data to be downloaded system resources can be utilized in an efficient manner. Additional user interface controls may be employed for rapid and efficient access to portions of data minimizing delay and system resource occupation.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, a virtual list view in a web application may be dynamically updated by coordinating the user's scrolling actions with downloading data chunks such that a user can seamlessly access and manage the presented data. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process.

Figure 1:
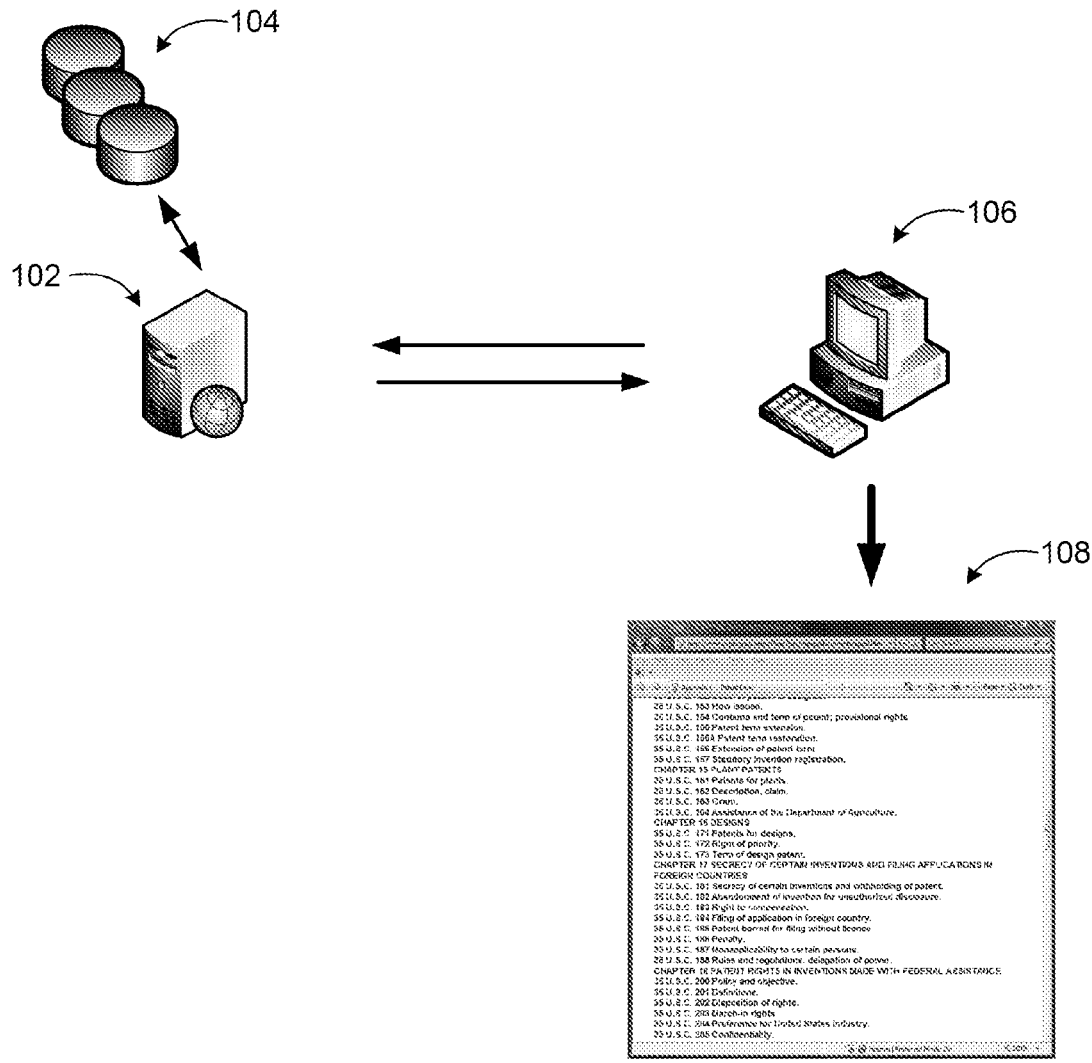
FIG. 1 is a conceptual diagram illustrating presentation of data in a web application between a server and a client.

Referring to FIG. 1, a conceptual diagram is illustrated for presentation of data in a web application between a server and a client. Web applications include a wide variety of applications that typically have a user interface in a client device/application (106) and exchange data with a data source such as server 102. The actual data for the application may reside in one or more data stores 104 and be managed by server 102.

The user interface 108 of the web application enables a user to view the data, perform operations on it, and provide input changing the data to be sent back to the data source. The data presented by the user interface may include textual data, graphical data or a combination of the two in various formats. For example, the data may be presented as various forms of lists, tables, free form text, pages, and in other formats.

Embodiments described below refer to web applications such as discussed above, but they are not limited to web applications. Any application that exchanges data through a network, where system resources and amount of exchanged data is subject to limitation, and that presents the data to a user in a list view format may implement a dynamic updating method according to embodiments. An example for such an application is an electronic mail application on a client device that provides users a list of received electronic mails (e.g. their subject line and the sender) while the electronic mail content mainly resides on a server. Such an electronic mail application does not need to be a web application. It may be an intranet application and use different network protocols (not necessarily HTTP) but still implement embodiments as described herein.

Other example applications where a dynamic updating of a virtual list view may be implemented include, but are not limited to, instant messaging applications, search engine result presentations, and the like. Such applications are also not limited to being implemented in Hyper Text Markup Language (HTML). Any type of programming language for browsing applications may be used. Furthermore, a width and height of the virtual list view may be dynamically variable based on properties such as number of rows in a data block, scroll speed, and others.

Figure 2:
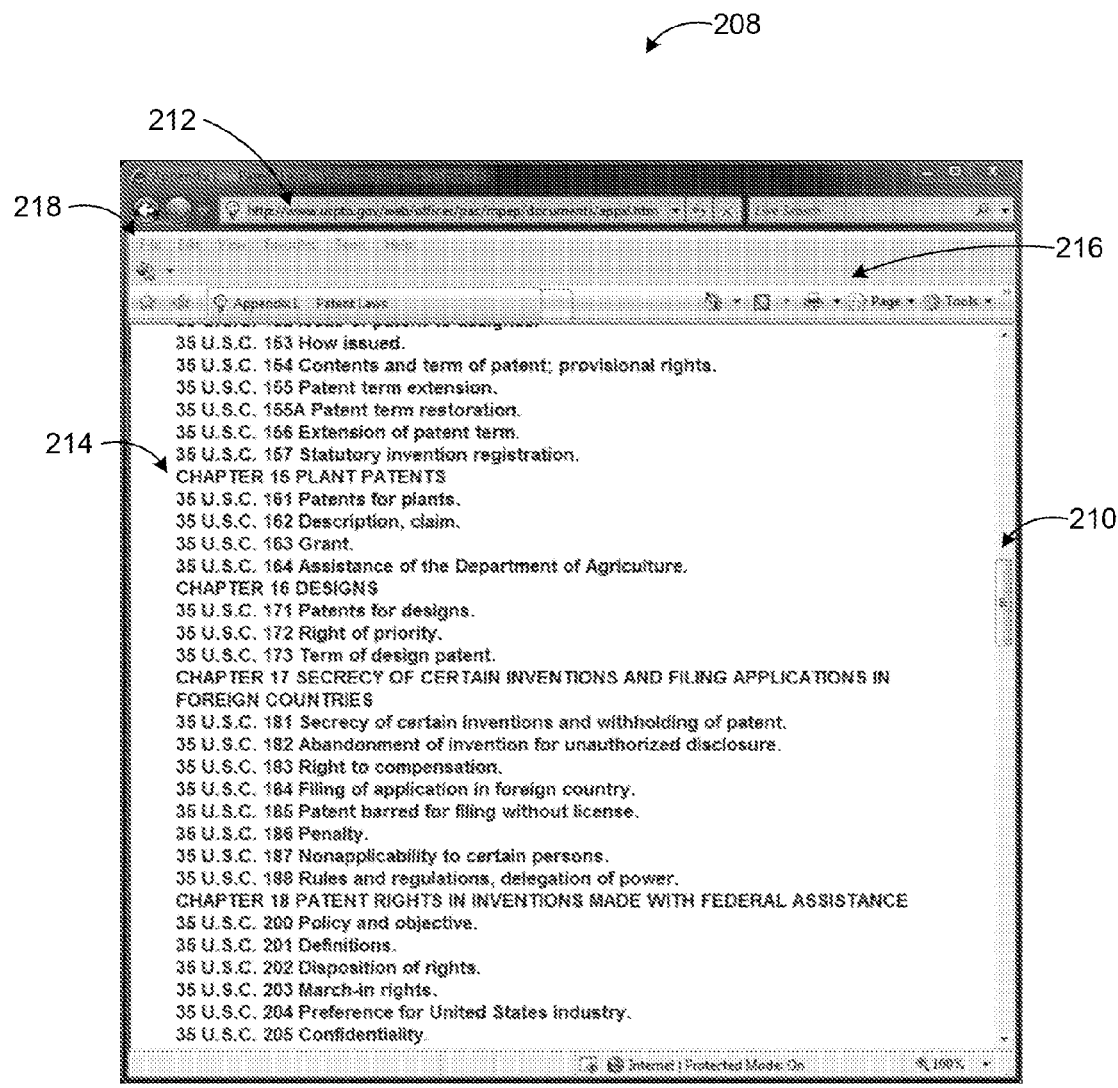
FIG. 2 illustrates a screenshot of an example webpage with virtual list view.

FIG. 2 illustrates a screenshot of an example webpage with virtual list view. As mentioned above, a dynamically updated virtual lists view may be implemented in any user interface presenting exchanged data in list form to a user.

Example webpage 208 is presented by a typical web browser user interface. The user interface includes the Uniform Resource Locator (URL) 212 of the presented webpage, menu commands 218, and operational icons 216. The main content is presented in list view 214. The example webpage is the Patent Laws section of the United States Patent Office website. As can be seen, the webpage contains a long list of U.S. Code with each line presenting a link to the particular section of the Code. The user interface is capable of presenting only a limited portion of the complete list. The presented portion of the list view is referred to as view port. Scroll bar 210 enables a user to scroll up and down on the list and view different portions of the list.

While the example list includes simple lines and may not take very long to download the whole list to a client, in many cases, the complete list view may be simply too long to download in one rapid operation or individual rows may include more data such that the downloading operation may not be able to keep pace with the scrolling action of the user resulting in delays of presentation or system resource exhaustion.

Figure 3:
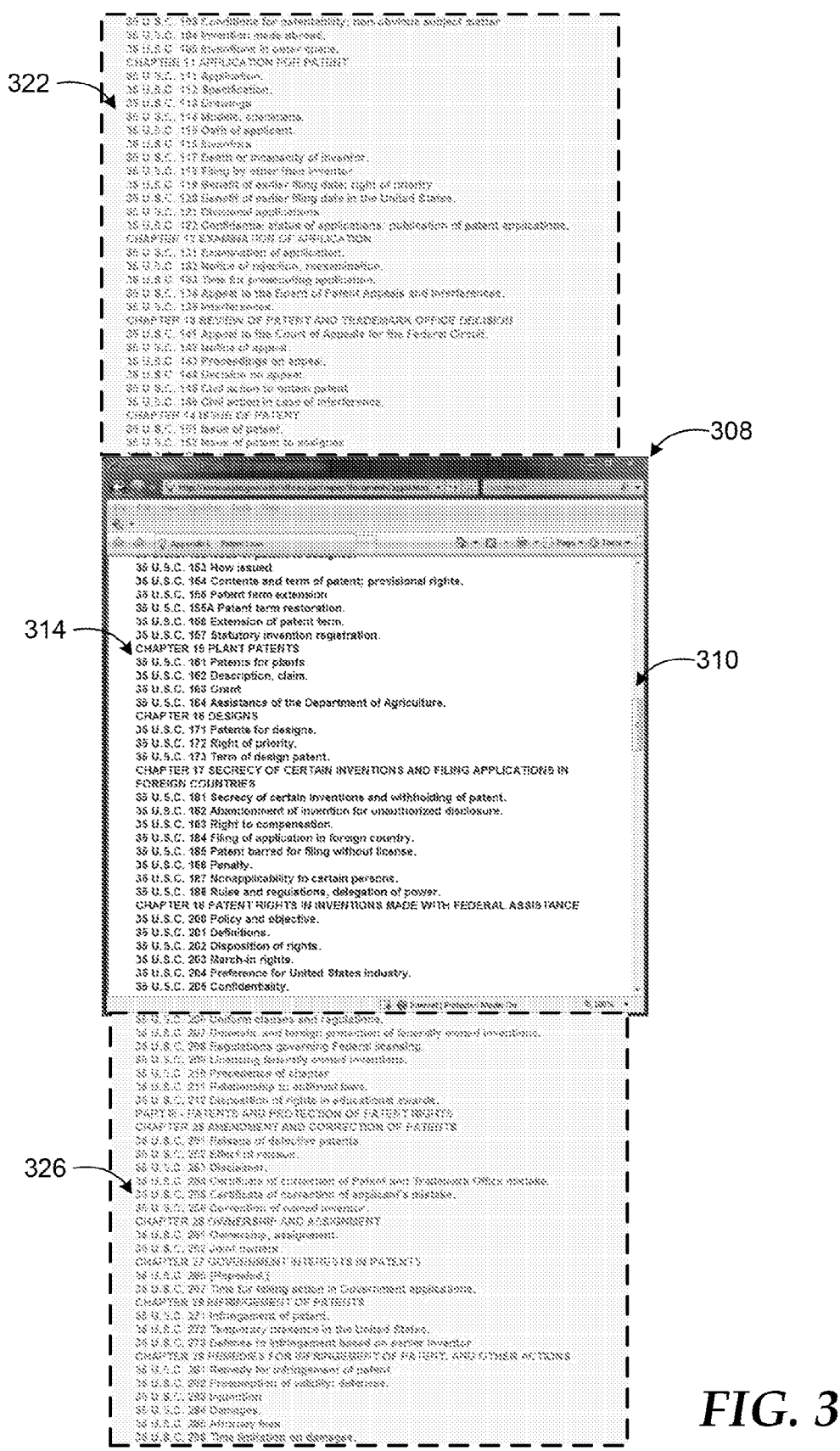
FIG. 3 illustrates the example virtual list view of FIG. 2 with previous and subsequent chunks of data in comparison to the chunk presented in the view port according to some embodiments.

FIG. 3 illustrates the example virtual list view of FIG. 2 with previous and subsequent chunks of data in comparison to the chunk presented in the view port according to some embodiments.

In a web browsing application according to embodiments, the virtual list view is composed of two main parts: the scrollbar 310 and the view port 314. These two elements are decoupled so that events from the scrollbar 310 can be captured and handled or discarded as desired. The view port contains "chunks" of rows (for example: in terms of HTML, a chunk may be a divider element "DIV" containing a table of rows and some additional metadata). The chunks are given a position (relative to a predefined reference) attribute, and by modifying their style property, it is possible to position any range of rows to be visible within the view port (as long as those rows are available on the client). As the user scrolls, chunks are added or removed from the view so as to maintain additional rows both above (322) and below (326) what is currently visible in the view port 314.

In order to minimize consumption of system resources (communication bandwidth, memory, etc.) by reducing data exchanged between the client and the data source, data may not be loaded if the user is scrolling faster than a predefined threshold. The threshold may be defined, according to one embodiment, as: 'if the scroll position has changed by more than N rows in the last M milliseconds, then the user is scrolling fast'. In this case, the view port may remain unchanged until the scrolling slows, at which point data is only loaded for the final position of the scrollbar.

Selection of row(s) for viewing may be maintained on the client as a hash on the row ID(s). This enables a fast look-up to know whether a row is selected, and can be enumerated to get the set of selected items. Selected individual items may also be added to the row selection since the row ID is already present on the client. The selected item may simply be added to the hash. For large range selections, some of the rows may not exist on the client. In that case, a synchronous call may be made to the server (data source) to reconstitute the view and return a set of row IDs that are included in the range. Of course, other methods of maintaining the row IDs may also be implemented without departing from the principles described herein.

In a practical network environment, the contents of the list may change in the data source. A user interface of the web application on the client needs to update dynamically to reflect this. Instead of preloading the entire dataset, which may be infeasible, an application according to embodiments may load only the region of data that the user is currently viewing, plus enough to be able to update the client quickly if the user scrolls a short way.

Updates may be propagated to the client on a per row basis, when the data source changes. The server may send the client minimal data to update the view, depending on whether a row was inserted, removed, or changed. It may include the ID of the affected row, new mark-up for the row, and its position in the list (indicated by the ID of the previous row). The client may then apply these updates.

According to another embodiment, a watermark may be included with each batch of updates, because the view on the client may be out of sync with the server. The watermark may be sent back with any list view operation (e.g. delete, move) and compared with the current watermark on the server. If the watermarks do not match, it may mean that some updates must have been en route at the time of the update and were not accounted for. In this case, the server may notify the client to retry the operation after those updates are applied.

Figure 4:
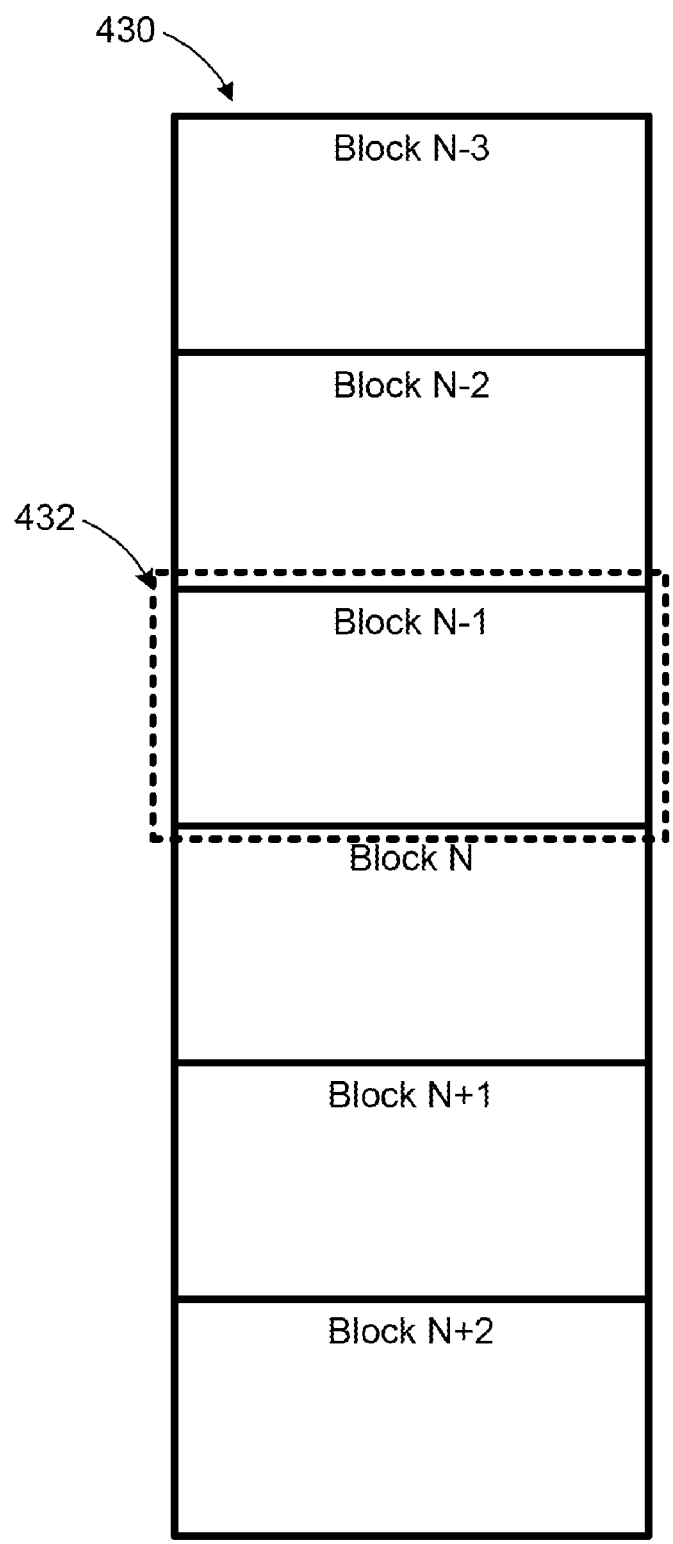
FIG. 4 is diagram of data blocks that may be downloaded in chunks for dynamically updating a virtual list view according to embodiments.

FIG. 4 is diagram of data blocks that may be downloaded in chunks for dynamically updating a virtual list view according to embodiments.

As discussed above, the data in a virtual list view may be downloaded and presented in blocks (430) in the view port. According to one embodiment, one block of data before and one block of data (both comprising a predefined number of rows) may be downloaded in addition to the currently viewed block 432 (e.g. blocks N−1, N, and N+1). If the user scrolls faster than a predefined threshold any subsequent blocks may be skipped until the scrolling slows down to a level below the threshold and three sequential blocks may again be downloaded to present the user his/her current selection of data rows.

Embodiments are not limited to downloading three sequential blocks of data, however. Any number of blocks before and after the currently viewed block may be downloaded to the client based on a number of factors such as available communication bandwidth, type of data, user preferences, scrolling speed, size of the view port, available memory, and the like. This way, a portion of the whole data is available for viewing without roundtrip traffic between the client and the data source. Furthermore, an algorithm may be implemented to predict a number of data blocks for preemptive downloading by using artificial intelligence based on past information of how many data blocks were downloaded and how they were used by the user.

As mentioned previously, the data at the source may change while the user is viewing a portion on the client. If some rows exist and others do not in a selection, a call may be made to the data source to retrieve the missing rows such that the selection is preserved. If new rows are created or updated, these are not deleted in the selection, again to preserve the selection.

Figure 5:
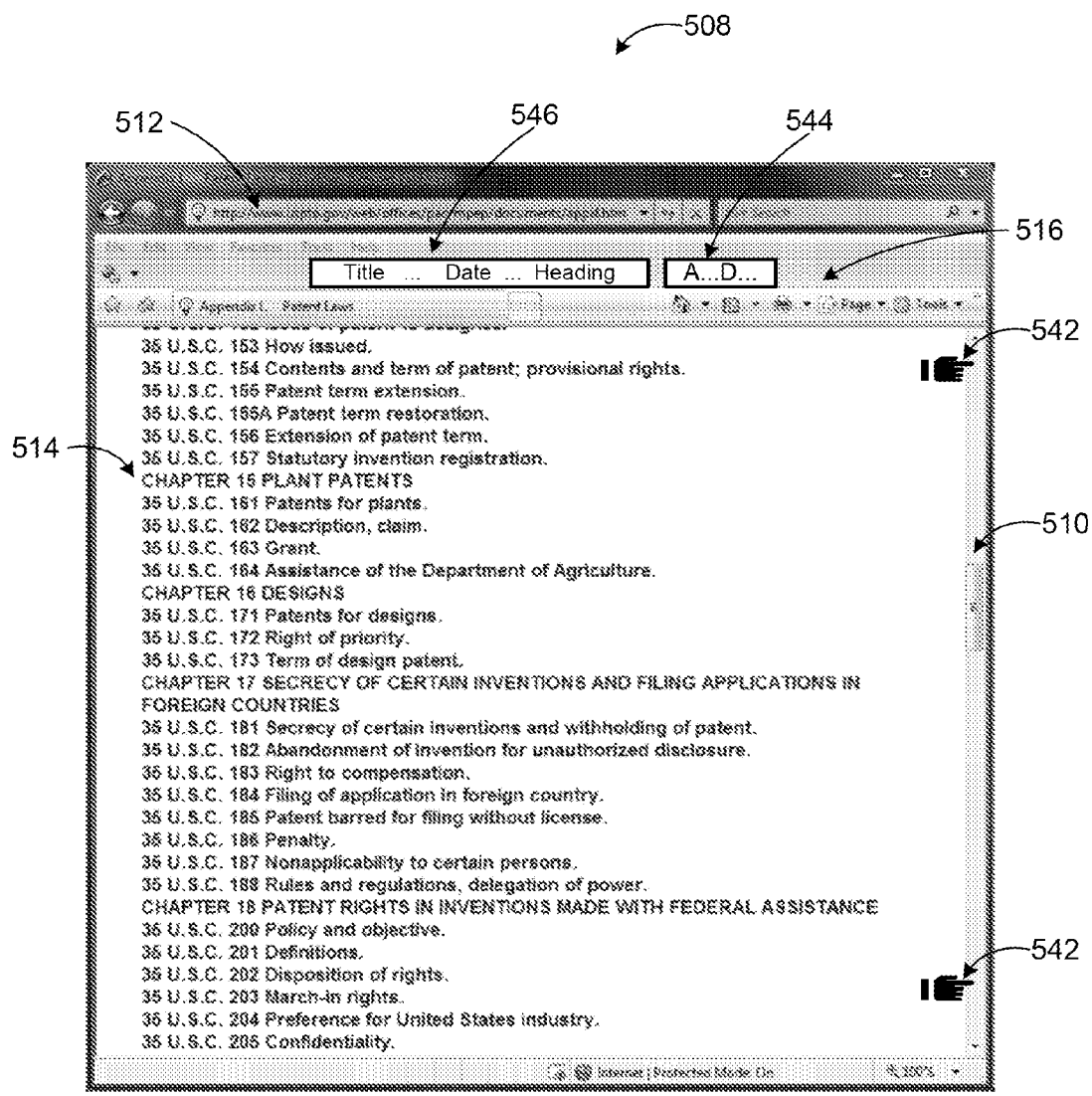
FIG. 5 is the another screenshot of the example list view of FIG. 2 with additional user interface controls for accessing portions of data efficiently.

FIG. 5 is the another screenshot of the example list view of FIG. 2 with additional user interface controls for accessing portions of data efficiently.

Several control features may be provided in a user interface for dynamically updating a virtual list view to enhance user experience and ease of access to data. In the example web browser user interface 508, the standard elements such as the URL 512, operational icons 516, and the scroll bar 510 are shown along with the portion of the virtual list view 514.

One enhanced control feature is scroll-marking. A user may wish to return to particular portions of the virtual list view throughout his/her interaction with the data. A scroll-marking icon such as icon 542 may be used to indicate positions along the scroll bar upon user indication (e.g. right clicking on a pointer device, selection of a menu bar item, etc.) In a further enhancement of the scroll-marking feature, each scroll-marking icon may be associated with a row corresponding to that position and summary information about the row may be presented to the user without interrupting the viewing experience (e.g. in a pop-up box when the user hovers over the scroll-marking icon).

Different ways of downloading data was discussed previously, where chunks are downloaded based upon a speed of scrolling. If the user scrolls slower than a threshold, the view is updated continuously. If the scrolling speed exceeds the threshold, the view may be frozen until the scrolling is slowed again and new chunks of data are downloaded for viewing. The threshold may be preset or dynamically determined based on select properties of the system. Another enhanced control feature may include presenting the user with a preview of passed rows of data while the user is scrolling rapidly through them. The preview may be based on groups of rows and categorized based on user-defined (or selected) parameters such as title, heading, date, and so on. For example, if the user is scrolling rapidly through the U.S. Code (title 35), the preview box (546) may show individual chapters such as chapter 15 "Plant Patents", chapter 17 "Designs", and the like, preventing the user from accidentally scrolling over the rows he/she wishes to view.

The preview feature may be structured in any way selectable by the user or based on default parameters. The parameters may include grouping types, metadata types, and sorting style (alphabetical, date, title, etc.).

A further enhanced control feature is referred to as jump-to control (544). This feature enables the user to seek a particular position in a large list without having to load the whole list view. For example, an alphabetic selection of the rows may enable the user to jump to a particular row instead of scrolling down to that location as shown in the figure. As in the preview feature, the jump-to control may be based on a number of criteria such as alphabetic, chronological, user-defined, and the like. According to one embodiment, the jump-to control may be provided as a dropdown menu appropriate to a sort criterion. For example, if the list is sorted alphabetically, the menu may display the letters of the alphabet, or if sorted by date the menu may show a date picker. Selecting a value in the dropdown menu then causes the list to seek to the first row that is equal to or after the selected value.

A dynamically updated virtual list view according to embodiments may be implemented with additional or fewer components and features than those described above in conjunction with the example applications. An application implementing such a list view may be executed in one or more computing devices locally, over in a networked manner. The data may be stored in one or more servers or data stores. The data may be structured or unstructured, encrypted or unencrypted. Furthermore, additional methods may be employed to optimize operation instead of or in addition to the example enhanced control features.

Figure 6:
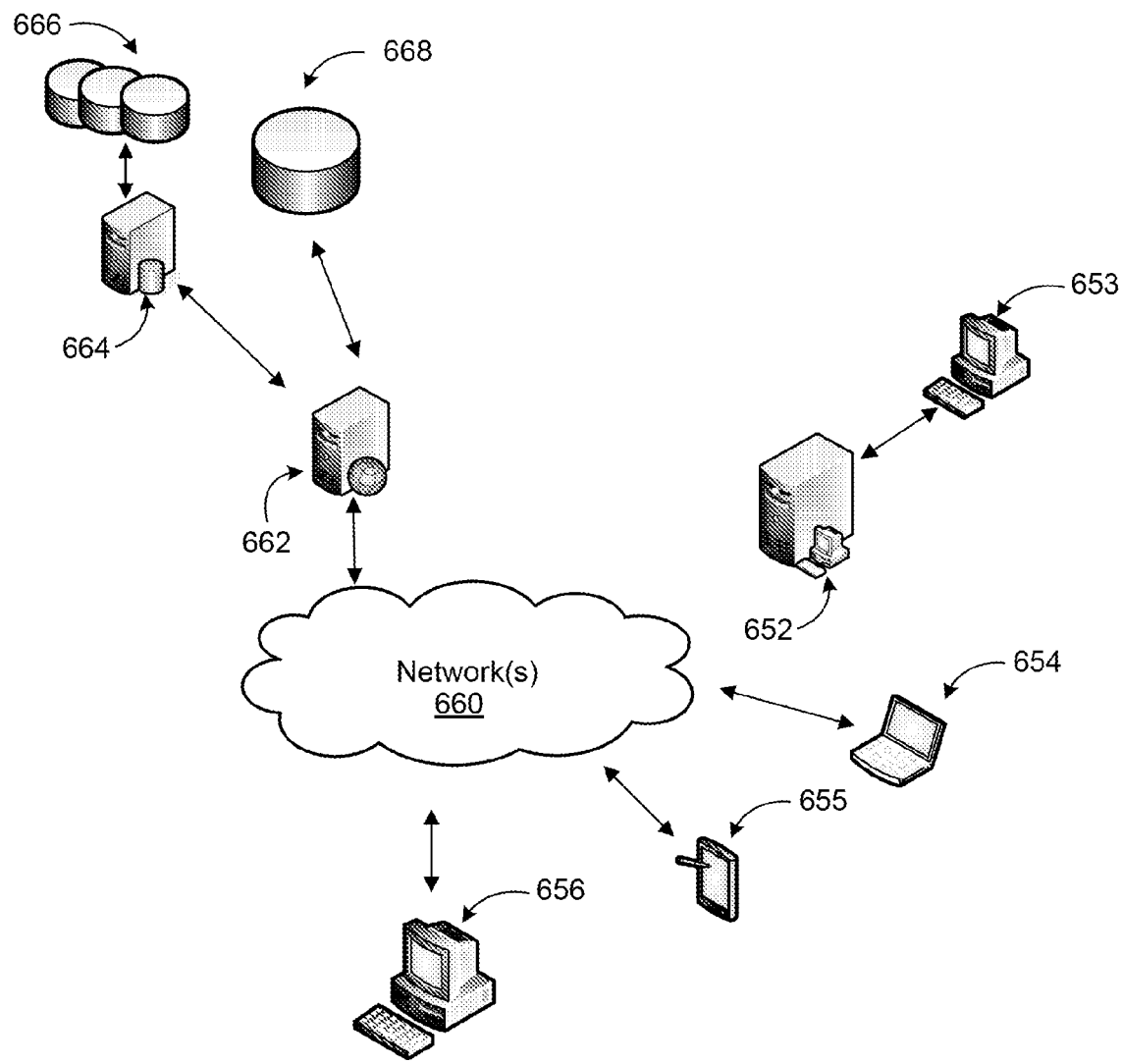
FIG. 6 illustrates a networked environment, where embodiments may be implemented.

FIG. 6 is an example networked environment, where embodiments may be implemented. Dynamic updating of virtual list views may be implemented in local or distributed applications running on one or more computing devices configured in a distributed manner over a number of physical and virtual clients and servers. It may also be implemented in un-clustered systems or clustered systems employing a number of nodes communicating over one or more networks (e.g. network(s) 660).

Such a system may comprise any topology of servers, clients, Internet service providers, and communication media. Also, the system may have a static or dynamic topology, where the roles of servers and clients within the system's hierarchy and their interrelations may be defined statically by an administrator or dynamically based on availability of devices, load balancing, and the like. The term "client" may refer to a client application or a client device. While a networked system implementing dynamically updated virtual list views may involve many more components, relevant ones are discussed in conjunction with this figure.

As mentioned above, a web application (or any application implementing list view updating) may be executed on client devices 654-656 or on server 652 and accessed by client device 653. Users may access data presented in virtual list view through network(s) 660 from web server 662. Web server 662 may manage and store the data itself using data store 668 or communicate with database server 664 managing data stores 666.

Network(s) 660 may include a secure network such as an enterprise network, an unsecure network such as a wireless open network, or the Internet. Network(s) 660 provide communication between the nodes described herein. By way of example, and not limitation, network(s) 660 may include wired media such as a wired network or direct-wired connection, and wireless media such as acoustic, RF, infrared and other wireless media.

Many other configurations of computing devices, applications, data sources, data distribution systems may be employed to implement distributed data storage for collaboration servers based on data categories. Furthermore, the networked environments discussed in FIG. 6 are for illustration purposes only. Embodiments are not limited to the example applications, modules, or processes.

Figure 7:
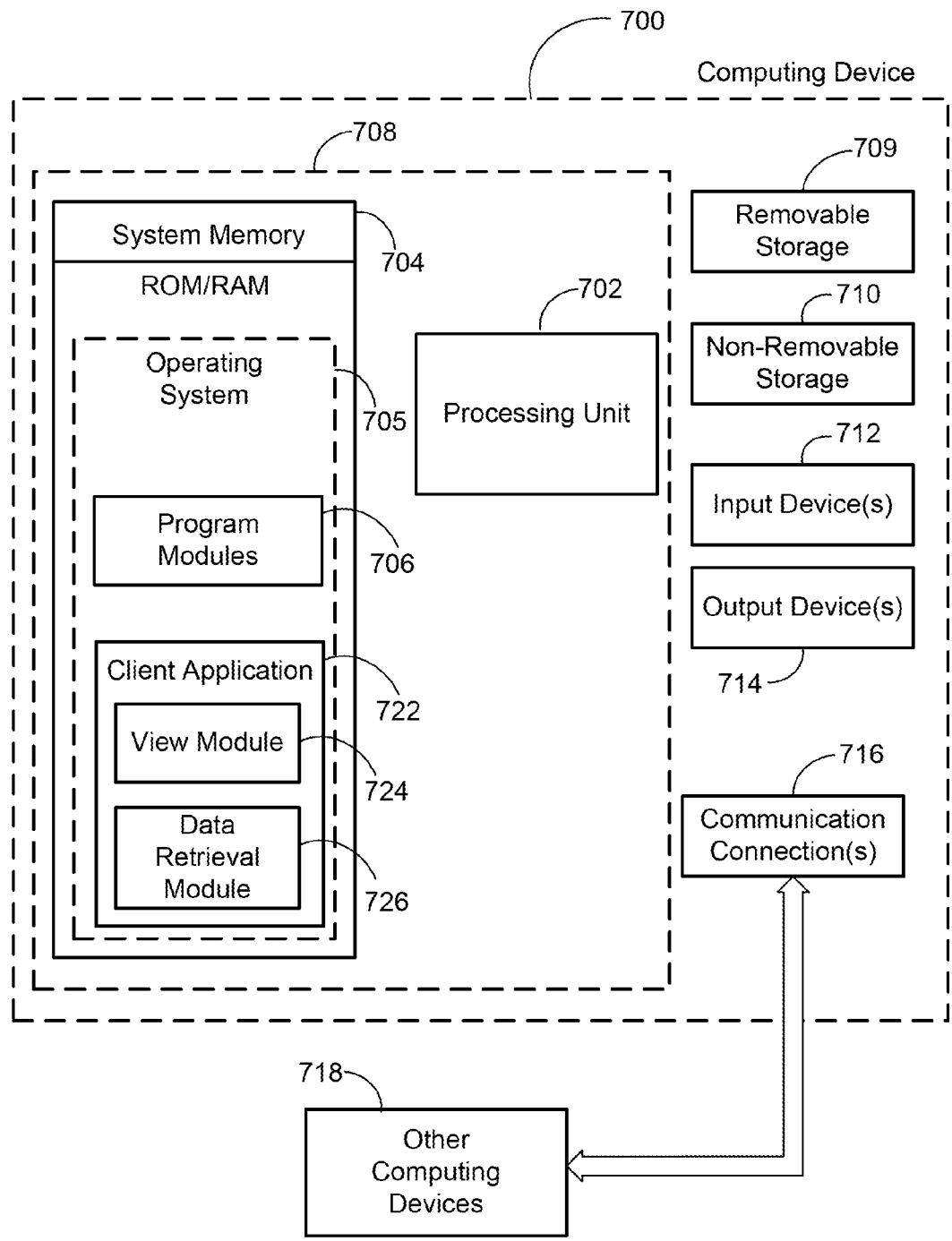
FIG. 7 is a block diagram of an example computing operating environment, where embodiments may be implemented.

FIG. 7 and the associated discussion are intended to provide a brief general description of a suitable computing environment in which embodiments may be implemented. With reference to FIG. 7, a block diagram of an example computing operating environment is illustrated, such as computing device 700. In a basic configuration, the computing device 700 may be a client device. Computing device 700 may typically include at least one processing unit 702 and system memory 704. Computing device 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of a networked personal computer, such as the WINDOWS® operating systems from MICROSOFT CORPORATION of Redmond, Wash. The system memory 704 may also include one or more software applications such as program modules 706, client application 722, view module 724, and data retrieval module 726.

Client application 722 may be any application presenting a user with data from another source in virtual list view like a web browsing application. Data retrieval module 726 may retrieve the data for presentation from the remote data source such as a web server. As explained previously, downloading the entire virtual list view may be impractical or infeasible due to system resource limitations. View module 724 may coordinate the user's scrolling with the corresponding data chunks and enable the data retrieval module 726 to retrieve only those data chunks that are needed for immediate viewing by the user. View module 724 may also provide the enhanced control features discussed above in conjunction with FIG. 5. This basic configuration is illustrated in FIG. 7 by those components within dashed line 708. The functionality of client application 722 does not have to be assigned to two distinct modules as described here. The above disclosed functionality may be performed by more or fewer modules or all by the same application.

The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by removable storage 709 and non-removable storage 710. Computer storage media may include volatile and non-volatile, removable and non-removable media implemented in any method or technology for storage of information, such as computer readable instructions, data structures, program modules, or other data. System memory 704, removable storage 709, and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of device 700. Computing device 700 may also have input device(s) 712 such as keyboard, mouse, pen, voice input device, touch input device, etc. Output device(s) 714 such as a display, speakers, printer, etc. may also be included. These devices are well known in the art and need not be discussed at length here.

The computing device 700 may also contain communication connections 716 that allow the device to communicate with other computing devices 718, such as over a wireless network in a distributed computing environment, for example, an intranet or the Internet. Other computing devices 718 may include web servers, database servers, file servers, provider servers, and the like. Communication connection 716 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The claimed subject matter also includes methods of operation. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 8:
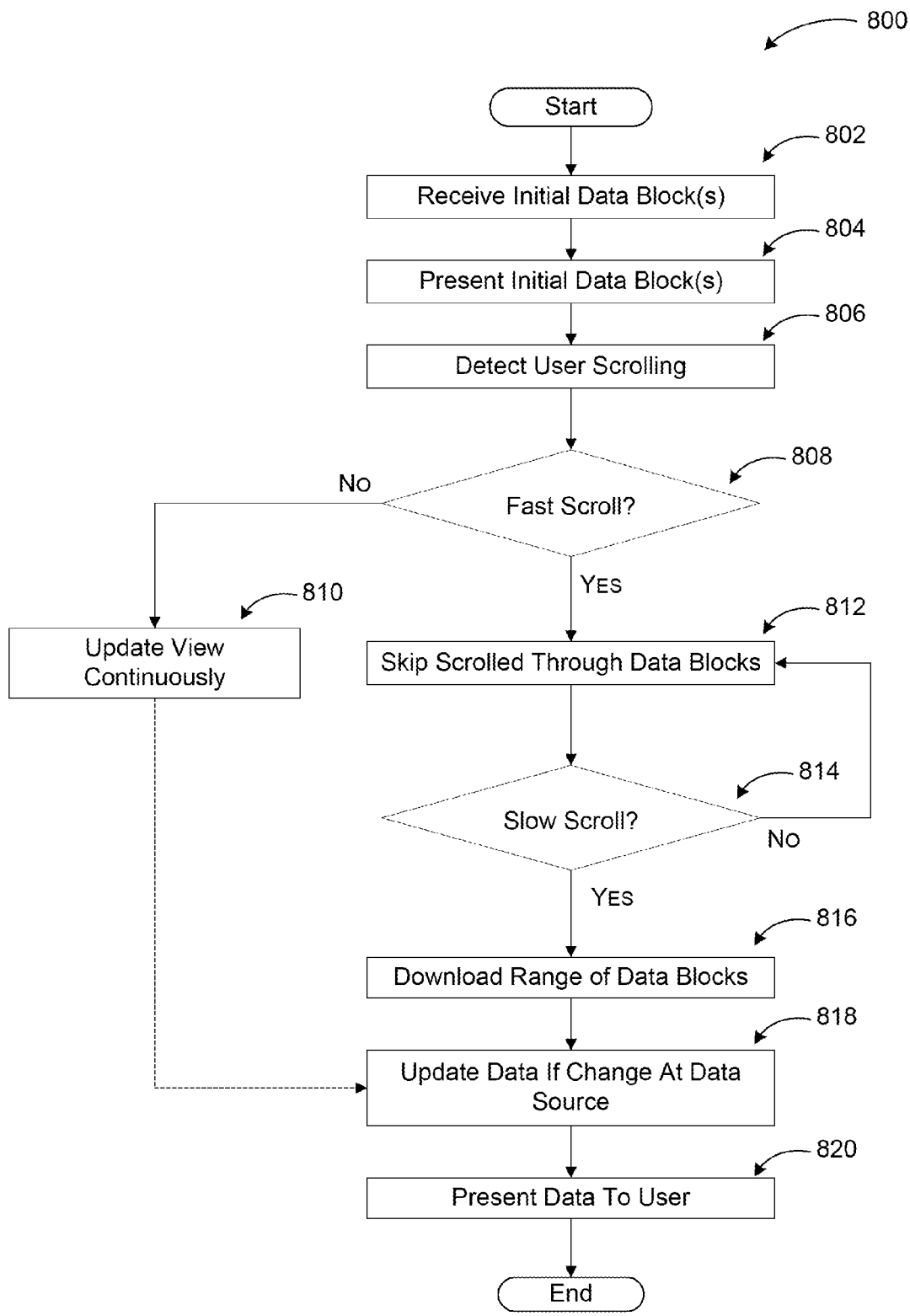
FIG. 8 illustrates a logic flow diagram of an example process for dynamically updating a virtual list view according to embodiments.

FIG. 8 illustrates a logic flow diagram of an example process 800 for dynamically updating a virtual list view according to embodiments. Process 800 may be implemented in any web application environment.

Process 800 begins with operation 802, where initial data blocks for presentation to a user are received form a data source such as the first view of a web page in a web browser application. Processing continues to operation 804 from operation 802.

At operation 804, the received initial data block(s) are presented to the user by the web application. Processing moves to operation 806 from operation 804.

At operation 806, the user's scrolling operation through the virtual list view is detected. As discussed above, the user may scroll at a slow pace or faster than it is feasible for the application to simultaneously download and present the data being scrolled through. Processing advances to decision operation 808 from operation 806.

At decision operation 808, a determination is made whether the scrolling is faster than a predetermined threshold or not. If the scrolling is not faster than the threshold, processing moves to operation 810, where the view is updated continuously because the data exchange is not one that could overwhelm the system resources.

If the scrolling is faster than the threshold, processing continues to operation 812 from decision operation 808, where the scrolled through data blocks are skipped (not downloaded to the client). The view may be frozen during that time frame and additional enhanced control features such as preview feature may be provided. Processing moves from operation 812 to decision operation 814.

At decision operation 814, a determination is made whether the scrolling has slowed down below the predefined threshold. If the scrolling is still above the threshold, processing returns to operation 812 for continued skipping of data being scrolled through. If the scrolling has slowed down, processing advances to operation 816.

At operation 816, a range of data blocks including one to be presented in the view port and a preset number before and after the presented block are downloaded to the client. Processing moves from operation 816 to operation 818.

At operation 818, the data is updated if there were any changes at the data source. Processing continues from operation 818 to operation 820.

At operation 820, the downloaded data blocks are presented to the user in the slow scroll mode. After operation 820, processing moves to a calling process for further actions.

The operations included in process 800 are for illustration purposes. Dynamically updating a virtual list view in a web application may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for dynamically updating a virtual list view, the method comprising:
    detecting a speed of scrolling by a user in a virtual list view presentation of an application user interface presenting downloaded data;
    when the scrolling speed is below a predefined threshold, continuing to download the data and updating the presentation in a view port continuously;
    when the scrolling speed is above the threshold, skipping downloading for blocks of data rows that are scrolled through by the user until the scrolling speed drops below the threshold again;
        when the scrolling speed drops below the threshold again, downloading a preset number of blocks that include a block to be presented in the view port and a number of blocks preceding and following the block to be presented; and
        displaying the block to be presented in the view port;
    determining whether a number of rows in a selection are absent at the computing device;
    when a number of rows in a selection are absent at the computing device, initiating a synchronous call to a data source maintaining data of the absent number of rows for requesting missing rows utilizing row identifiers;
    determining whether a portion of data at the data source has changed; and
    when a portion of data at the data source has changed, updating the application user interface by providing an identifier of an affected data row, a change for the data row, and a position indicator for the row, wherein the update is performed in one of: a per row basis, and a batch of rows basis.

2. The method of claim 1, wherein a number of data rows in each block is determined based on at least one from a set of: an available communication bandwidth, a type of data, a user preference, the scrolling speed, a size of the view port, and available memory.

3. The method of claim 1, wherein the number of blocks preceding and following the block to be presented is determined based on at least one from a set of: an available communication bandwidth, a type of data, a user preference, the scrolling speed, a size of the view port, and available memory.

4. The method of claim 1, wherein the virtual list view comprises at least one of textual data and graphical data in form of at least one from a set of: a numbered list, a bulleted list, a table, free form text, and a page format.

5. The method of claim 1, further comprising: assigning each block in the virtual list view a position attribute relative to a predefined reference, wherein the position attribute is associated with a row identifier such that any range of rows can be selected for presentation in the view port.

6. The method of claim 5, wherein the identifier is stored as metadata.

7. The method of claim 5, wherein a selection of rows for viewing is maintained by the application as a hash on row identifiers.

8. The method of claim 1, further comprising:
    including a watermark with each update from the data source;
    sending back a watermark from the application user interface to the data source; and
    determining an update status of the data at the application user interface based on a comparison of the watermark at the data source and the watermark sent back from the application user interface.

9. The method of claim 1, wherein the application includes one of: a web browsing application, an electronic mail application, an instant messaging application, and a search engine application.

10. The method of claim 1, wherein the scrolling speed threshold is defined as a change in a scroll position by more than a predetermined number of rows in a preset period.

11. A system for dynamically updating a virtual list view, the system comprising:
    a communication module for exchanging data with a data source;
    a memory; and
    a processor coupled to the memory and the communication module capable of executing a client application configured to:
        download a first block for displaying in a view port and a preset number of blocks preceding and following the first block to be displayed from the data source;
        assign each block in the virtual list view a position attribute relative to a predefined reference, wherein the position attribute is associated with a row identifier such that any range of rows can be selected for display in the view port;
        detect a speed of scrolling by a user;
        compare the speed of scrolling to a predefined threshold;
        when the speed is below the predefined threshold, continue to download the data in blocks and update the view port continuously;
        when the speed is above the threshold, skip downloading of blocks that are scrolled through by the user until the speed drops below the threshold;
        when the speed drops below the threshold, download another preset number of blocks that include a block to be displayed in the view port and a number of blocks preceding and following the block to be displayed; and
        update the view port; and
        when a portion of data at the data source has changed, updating the client application by providing an identifier of an affected data row, a change for the data row, and a position indicator for the row, wherein the update is performed in one of per row basis and batch of rows basis.

12. The system of claim 11, wherein the client application is further configured to: enable the user to place a marker at a selected location on a scroll bar for indicating a position of a data row for subsequent viewing.

13. The system of claim 12, wherein the marker is associated with a pop-up box providing summary information to the user about the data row at the selected location.

14. The system of claim 11, wherein the client application is further configured to: provide a preview of skipped data rows sorted based on a criterion that includes at least one from a set of: a title, a heading, a date, and a user-defined attribute.

15. The system of claim 11, wherein the client application is further configured to: enable the user to jump to a selected row without scrolling in response to a user selection from a user interface menu that includes a selection of ranges based on sort criteria including one of: an alphabetical sort, a title sort, a chronological sort, and a user-defined sort.

16. A computer-readable storage medium with instructions encoded thereon for dynamically updating a virtual list view, the instructions comprising:
    downloading a first block for displaying in a view port of a web application and a preset number of blocks preceding and following the first block to be displayed from a data source;
    assigning each block in the virtual list view a position attribute relative to a predefined reference, wherein the position attribute is associated with a row identifier such that any range of rows can be selected for display in the view port;
    detecting a speed of scrolling by a user;
    comparing the speed of scrolling to a predefined threshold;
    when the speed is below the predefined threshold, continuing to download the data in blocks and update the view port continuously;
    when the speed is above the threshold, skipping downloading of blocks that are scrolled through by the user until the speed drops below the threshold;
    freezing the displayed rows while the speed is above the threshold and providing a preview of skipped data rows sorted based on a criterion that includes at least one from a set of: a title, a heading, a date, and a user-defined attribute;
    when the speed drops below the threshold, downloading another preset number of blocks that include a block to be displayed in the view port and a number of blocks preceding and following the block to be displayed;
    updating the view port;
    enabling the user to jump to a selected row without scrolling in response to a user selection from a user interface menu that includes a selection of ranges based on sort criteria including one of: an alphabetical sort, a title sort, a chronological sort, and a user-defined sort~ and
    when a portion of the data at the data source has changed, updating the web application by providing an identifier of an affected data row, a change for the data row, and a position indicator for the row, wherein the update is performed in one of per row basis and batch of rows basis.

17. The computer-readable storage medium of claim 16, wherein the instructions further comprise:
    determining a number of data rows to be downloaded by employing an artificial intelligence algorithm based on historic numbers of downloaded data rows and user activity on the downloaded rows.

* * * * *